United States Patent [19]

Chen

[11] Patent Number: 5,664,012
[45] Date of Patent: Sep. 2, 1997

[54] HANDS FREE DEVICE FOR A PORTABLE PHONE

[75] Inventor: Stephen Chen, Changhua, Taiwan

[73] Assignee: E. Lead Electronics Co., Ltd., Changhua, Taiwan

[21] Appl. No.: 553,896

[22] Filed: Nov. 6, 1995

[51] Int. Cl.$^6$ .................................................. H04M 1/00
[52] U.S. Cl. ........................... 379/420; 379/428; 379/433
[58] Field of Search ............................ 379/420, 428, 379/430, 433, 58, 61, 74, 80, 88, 90, 101, 174, 426; 455/89, 90, 128, 38.3

[56] References Cited

U.S. PATENT DOCUMENTS

| | | | |
|---|---|---|---|
| 4,481,382 | 11/1984 | Villa-Real | 379/61 |
| 5,155,860 | 10/1992 | McClure | 455/89 |
| 5,265,158 | 11/1993 | Tattari | 379/433 |
| 5,367,556 | 11/1994 | Mauri et al. | 379/58 |
| 5,406,618 | 4/1995 | Knuth et al. | 379/67 |
| 5,487,182 | 1/1996 | Hansson | 455/90 |

*Primary Examiner*—Krista M. Zele
*Assistant Examiner*—Taunya A. McCarty
*Attorney, Agent, or Firm*—Bacon & Thomas

[57] ABSTRACT

A portable hold-free device is set forth for a hand phone, including an interface board and an external wire set. The interface board is sandwiched between a hand phone and a battery. A hold-free circuit set is contained in the interface board and connected to the external wire set. The external wire set includes an earphone and a microphone. The hold-free device enables the hand phone to be used without being held during driving a car, riding a motorcycle or a bicycle, walking or in other conditions in which the user is inconvenient to hold the hand phone. A speech memory IC is added to the interface board to serve as an answering machine.

5 Claims, 9 Drawing Sheets

5,664,012

1

HANDS FREE DEVICE FOR A PORTABLE PHONE

BACKGROUND OF THE INVENTION

The present invention relates to a portable hold-free device for a hand phone, which enables the hand phone to be used without being held during driving a car, riding motorcycle or a bicycle, walking or in other conditions in which it is inconvenient for the user hold the hand phone.

FIG. 1 shows a conventional portable hold-free device for a hand phone, wherein the hold-free device 11 is connected with the hand phone 2 by an external wire 12 and a plug 13 thereof. The hold-free device 11 is equipped with an additional battery 14 for providing the power for the hold-free device 11. Therefore, the volume and weight of the hold-free device 11 are increased. Moreover, since the hold-free device 11 is connected to the hand phone 2 by the external wire 12, the hold-free device 11 is apt to swing during carriage. FIG. 2 shows another conventional hold-free device for a hand phone, which is specifically used in a car. The battery of the car provides the power for the hold-free device so that once the hold-free device is carried away from the car, no power will be supplied to the device. Therefore, when riding a motorcycle or a bicycle or walking or on other situations in which the user is inconvenient to hold the hand phone, the hold-free device cannot be used.

In addition, after being powered on, the power consumption of the hold-free device of the hand phone is always in a high load state. However, in such high load state, the communication time is less than the standby time so that the power of the battery is mostly wasted and the using time of the battery is considerably reduced. As a result, it is often necessary to carry several batteries when using the hand phone outdoors so as to ensure the uninterruption of a communication.

SUMMARY OF THE INVENTION

It is therefore a primary object of the present invention to provide a portable hold-free device for a hand phone, which can be conveniently used without an additional battery. The hold-free device includes an interface board and an external wire set. The interface board is sandwiched between a hand phone and a battery. A hold-free circuit set is contained in the interface board and connected to the external wire set. By means of the interface board, the battery provides power for both the hold-free circuit and the hand phone. Also, the hold-free circuit set includes a power-saving circuit by means of which when the hand phone is in a standby state, the hold-free device is under a low load condition so as to economically save the power and prolong the using time of the battery.

The present invention can be best understood through the following description and accompanying drawings, wherein:

2

Figure 5:
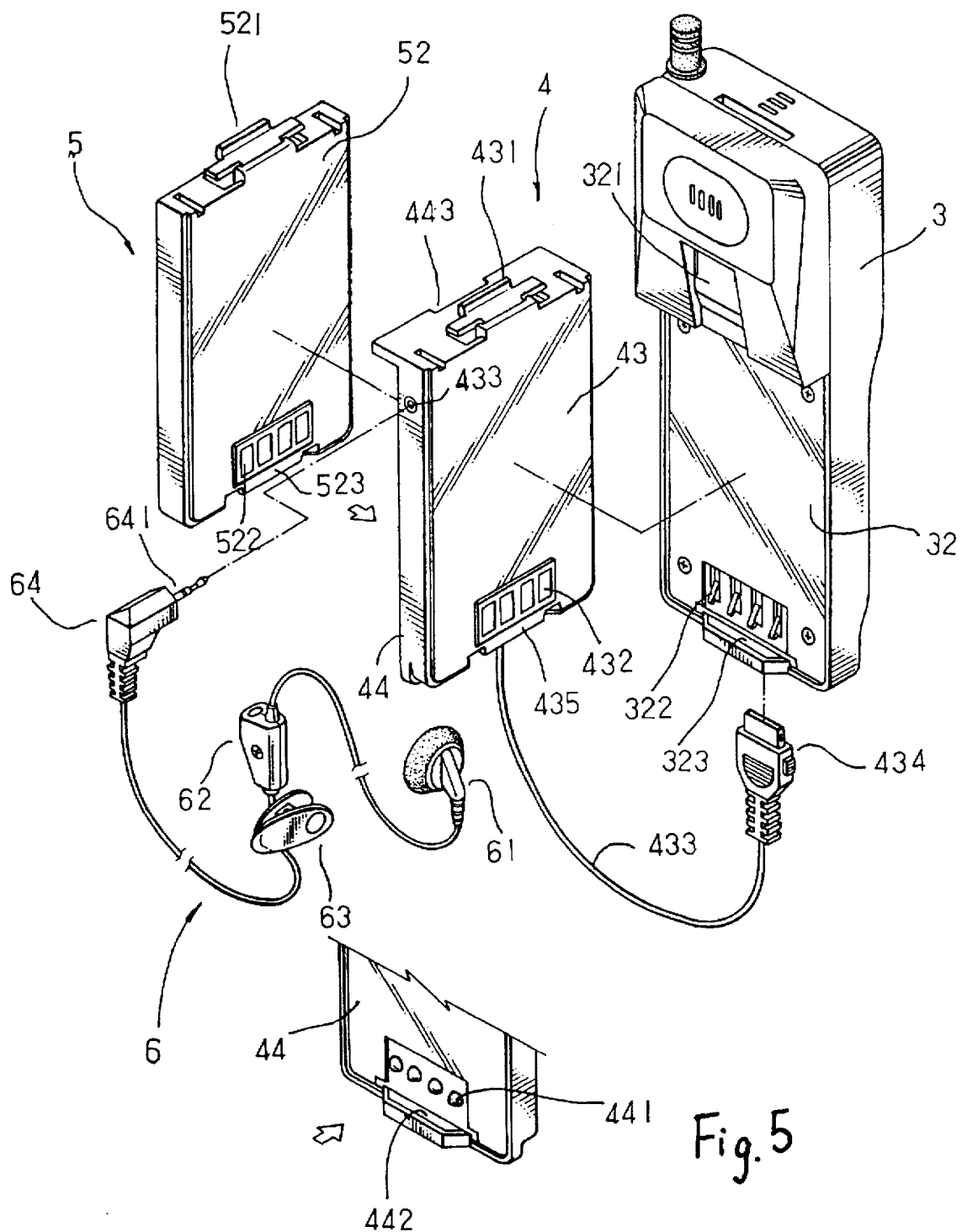
Figure 6:
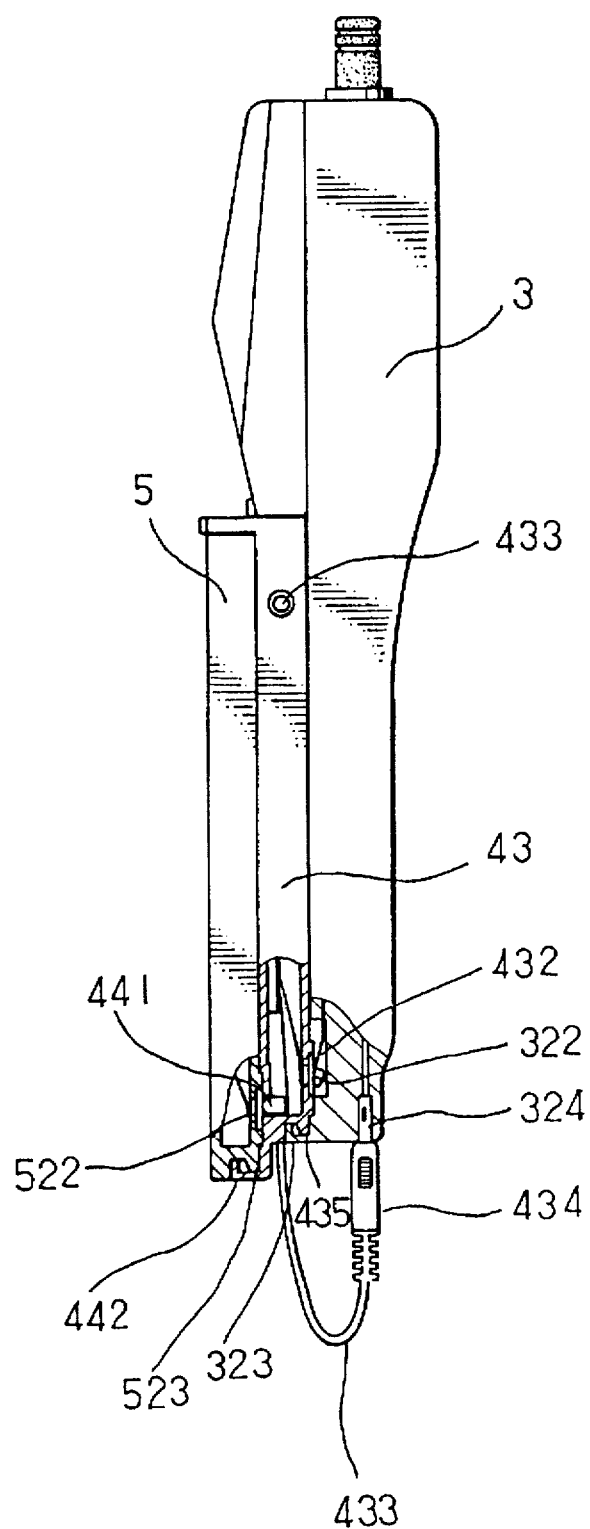
Figure 7:
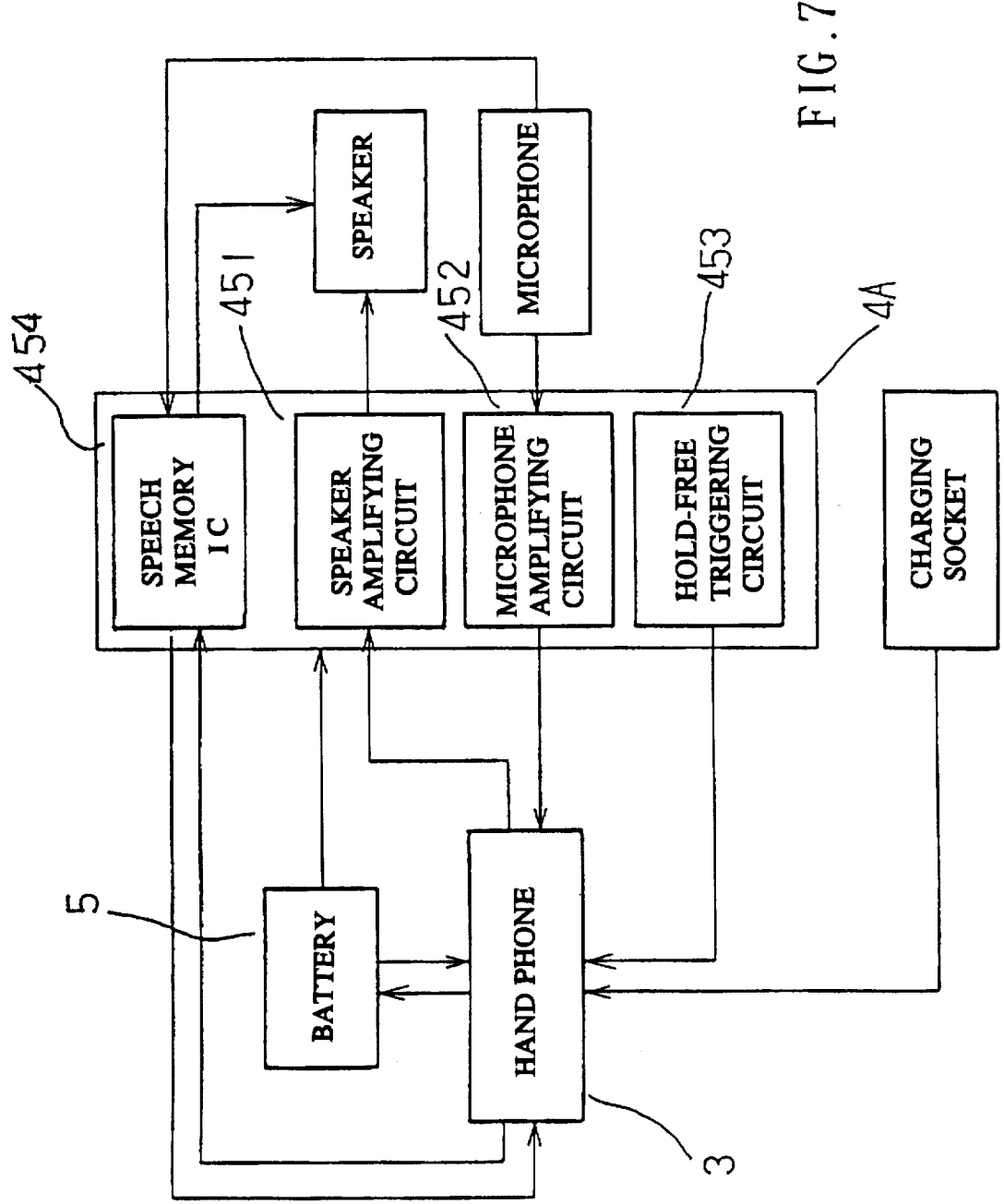
Figure 8:
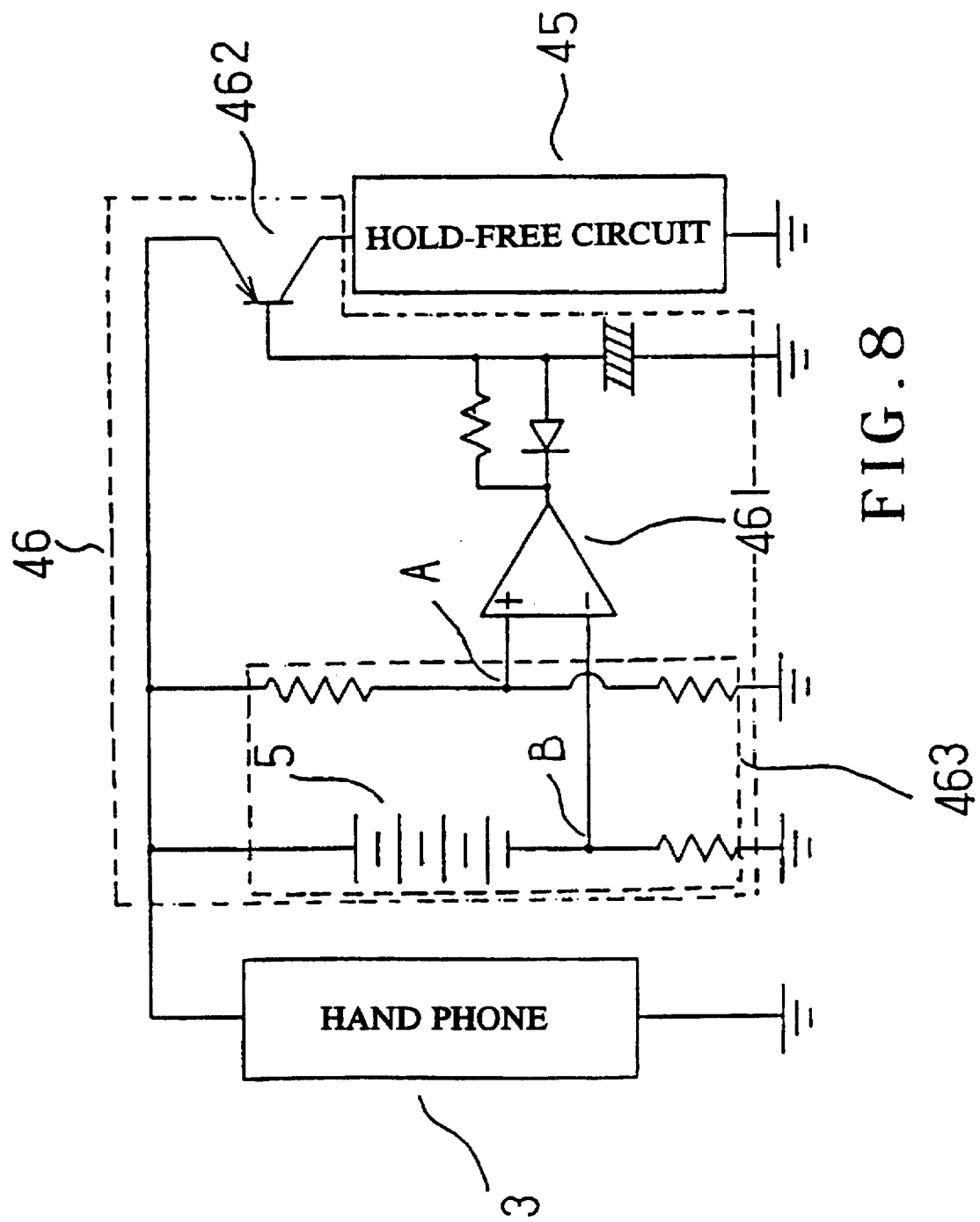
Figure 9:
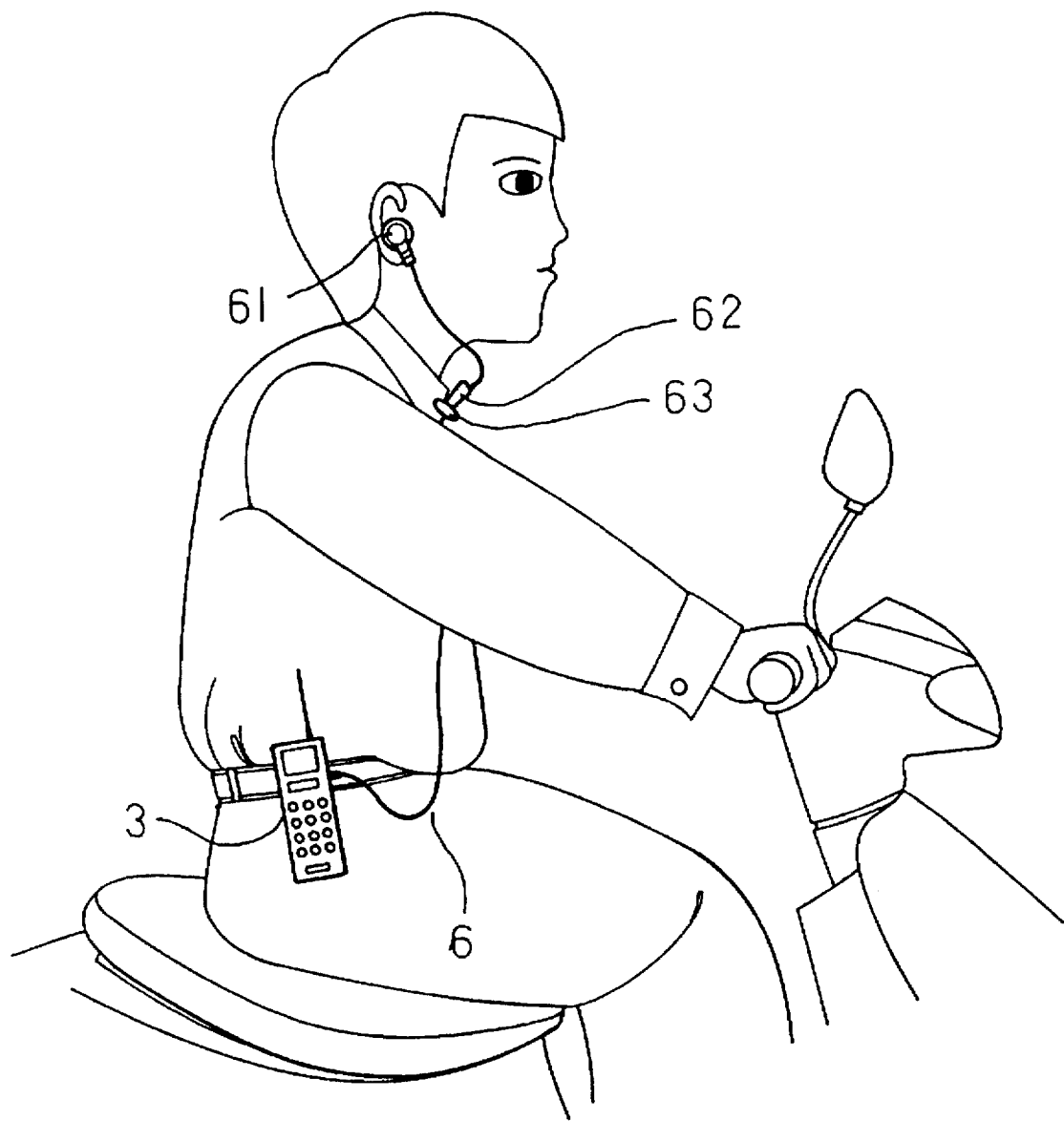

FIG. 5 is a perspective exploded view of another embodiment the present invention;

FIG. 6 is a sectional assembled view of the embodiment of FIG. 5;

FIG. 7 is a block diagram of the control circuit of the present invention;

FIG. 8 is a circuit diagram of the power-saving circuit of the present invention; and FIG. 9 shows the application of the present invention.

DETAILED DESCRIPTION OF THE PREFERRED EMBODIMENTS

Figure 1:
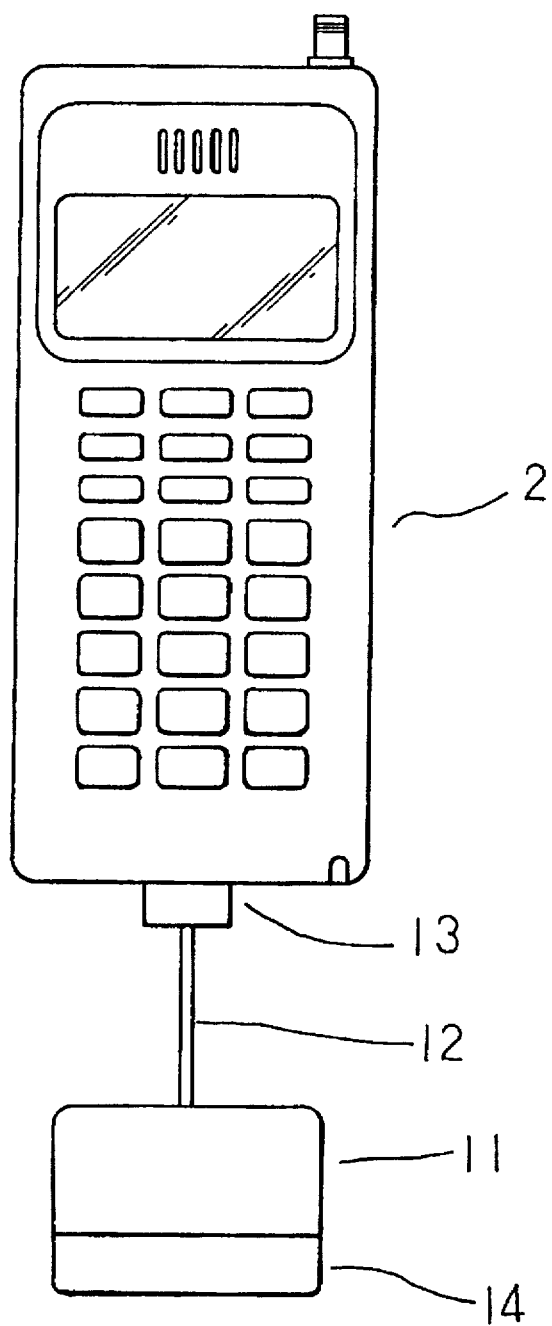
FIG. 1 shows a conventional hold-free device of a hand phone.
Figure 2:
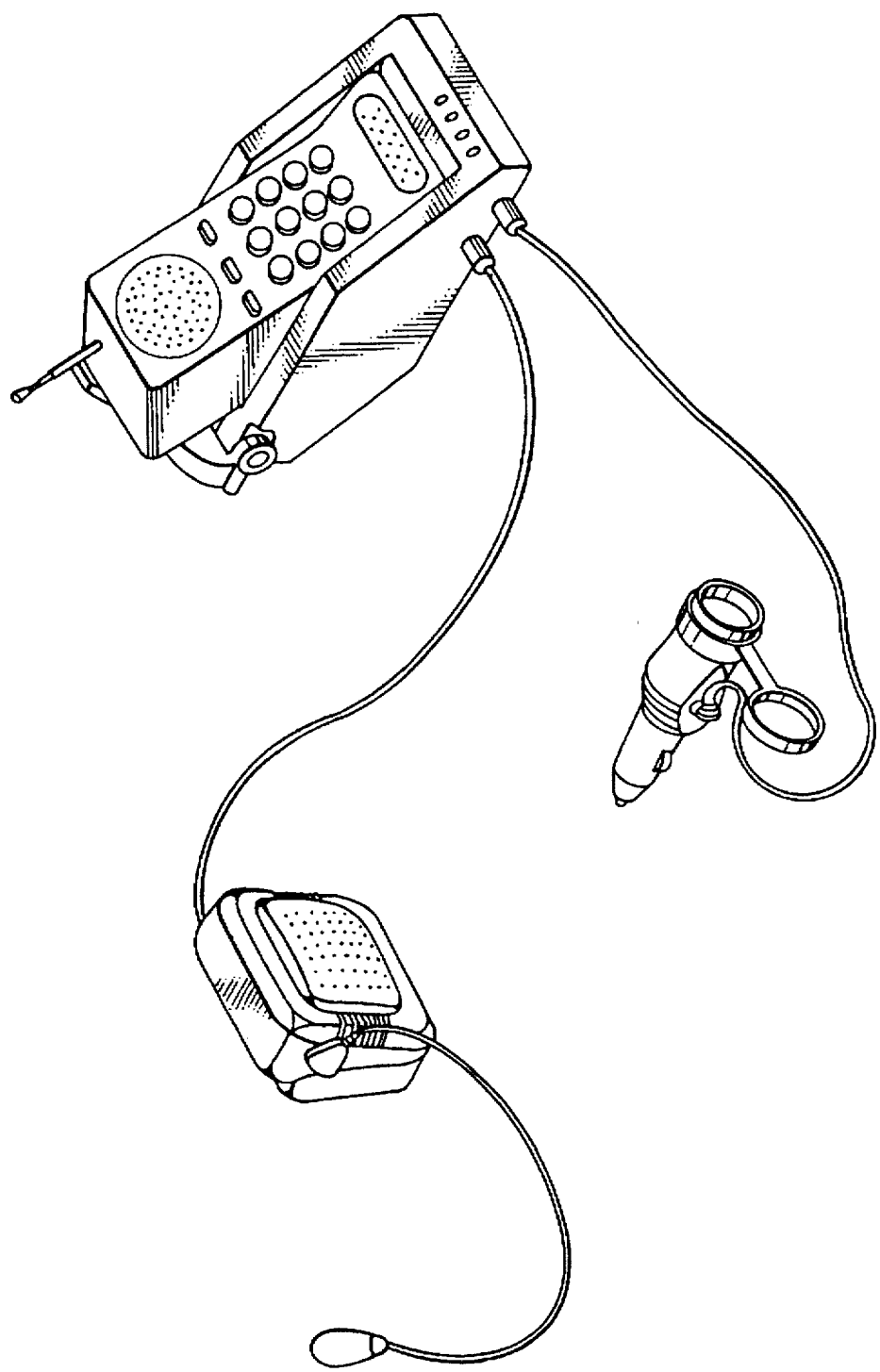
FIG. 2 is a perspective view of another type of hold-free device of a hand phone.
Figure 3:
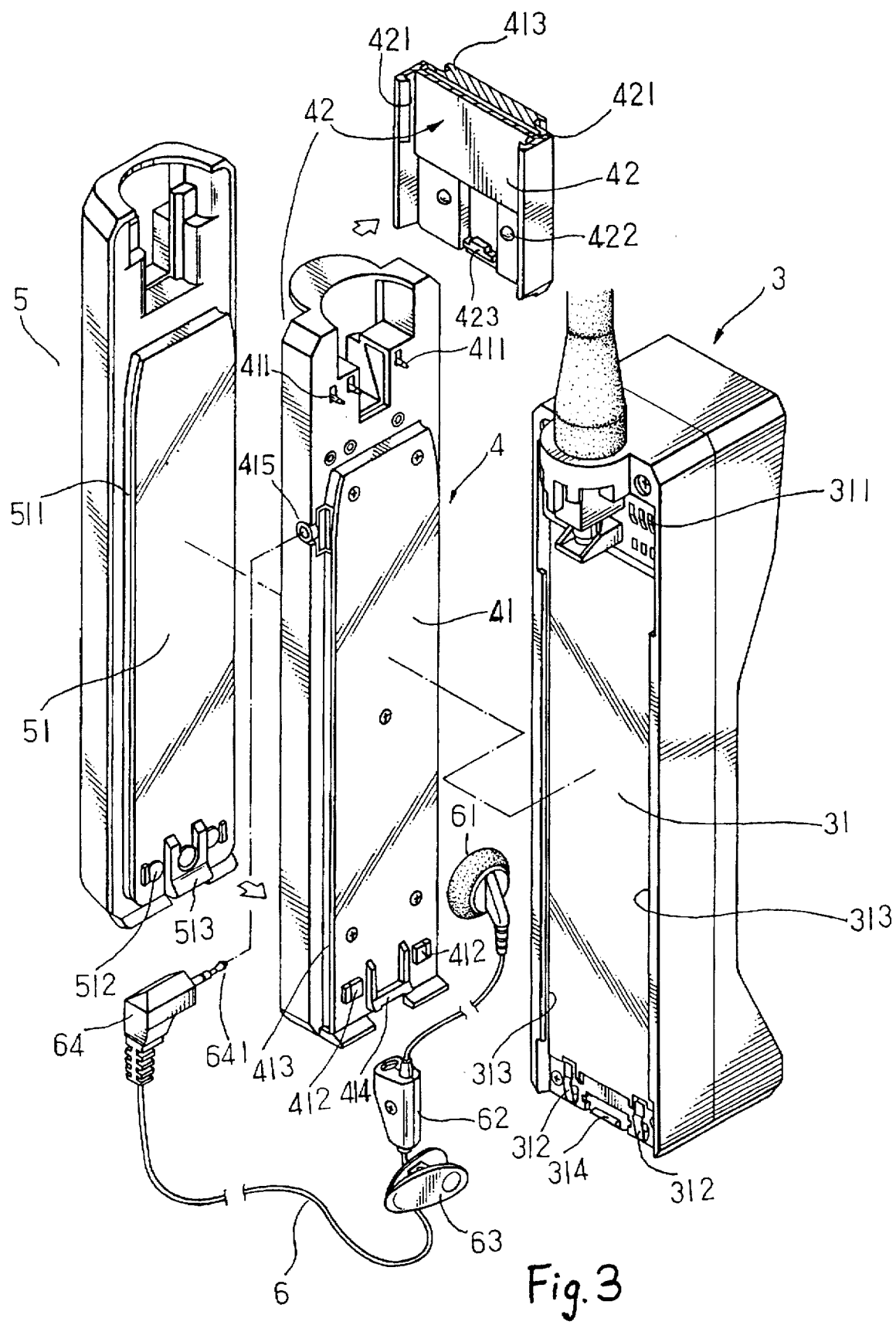
FIG. 3 is a perspective exploded view of the present invention.

Please refer to FIG. 3. The hand phone 3 of the present invention has a back face or rear surface 31 formed with two dovetail channels 313 on two sides. An interface board 4 has a front mating face or surface 41 formed with two rails 413 on two sides for engaging with-the dovetail channels 313. Several peripheral signal contacts 311 are disposed at an upper end of the back face 31 of the hand phone 3. Several power contacts 312 and a movable engaging block 314 are disposed at a lower end of the back face 31.

The interface board 4 is sandwiched between a battery 5 and the hand phone 3. Several contacts 412 corresponding to the power contacts 312 and an engaging seat 414 corresponding to the engaging block 314 are disposed at lower end of the front mating face 41 of the interface board 4. Several contacts 411 are disposed at upper end of the front mating face 41 corresponding to the peripheral signal contacts 311 o.f the hand phone 3.

The interface board 4 further has a back mating face or surface 42 formed with two dovetail channels 421 on two sides. Several power contacts 422 and an engaging block 423 are disposed at lower end of the back mating face 42. A control circuit is disposed in the interface board 4, which is connected to the hand phone 3 and the battery 5 through the contacts 411, 412, 422 and the corresponding contacts of the hand phone 3 and the battery 5. The interface board 4 is disposed with an external wire insertion hole 415 on one side for a terminal 641 of a plug 64 of an external wire set 6 to insert thereinto. The other end of the external wire set 6 is disposed with a clip 63, a microphone 62 and an earphone 61.

The battery 5 has a mating face or surface 51 disposed with several power contacts 512 and an engaging seat 513 at lower end and two rails 511 on two sides for engaging with the dovetail channels 421 of the back mating face 42 of the interface board 4.

The present invention is characterized in that the front mating face 41 of the interface board 4 is identical to the mating face 51 of the battery 5 and the back mating face 42 is identical to the back face of the hand phone 3. Therefore, the interface board 4 is permitted to be sandwiched between the battery 5 and the hand phone 3. A hold-free circuit set 4A (See FIG. 7) is received in the interface board 4, which serves to transmit power and signal via the respective contacts of the interface board 4.

Figure 4:
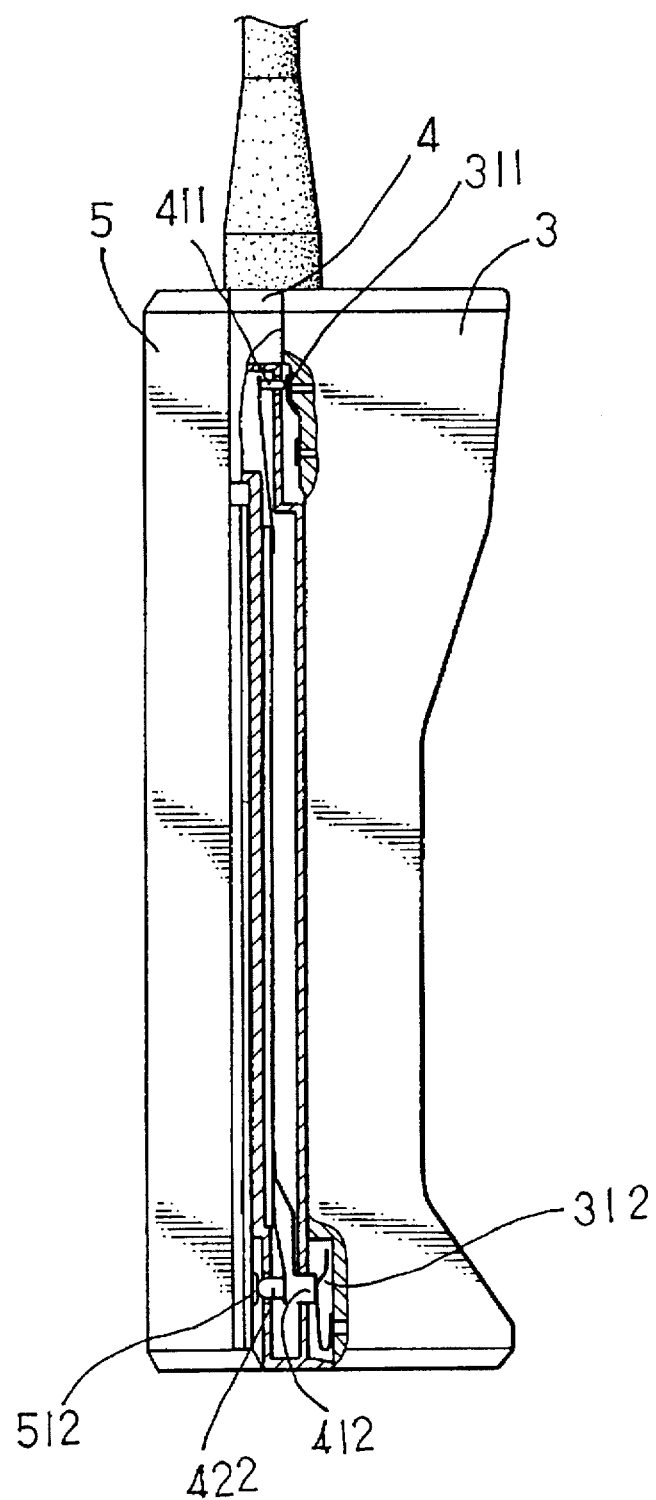
FIG. 4 is a sectional assembled view of the present invention.

Please refer to FIGS. 3 and 4. The power, contacts 512 of the mating face 51 of the battery 5 contact with the power contacts 422 of the back mating face 42 of the interface board 4 Which through the hold-free circuit set 4A (FIG 7) connect to the contacts 412. The contacts 412 further contact with the power contacts 312 of the back face 31 of the hand phone 3 so that the battery 5 is able to provide power for both the hand phone 3 and the hold-free circuit set 4A.

The peripheral signal contacts 311 of the back face 31 of the hand phone 3 contact with the contacts 411 of the interface board 4 so as to transmit the controlling signal to the peripheral equipments such as shown in FIGS. 3 and 4. However, some types of hand phones are not equipped with such peripheral signal contacts on the back face and have only a socket at lower end for transmission of the signals of the peripheral equipments such as shown in FIGS. 3 and 6. The interface board 4 of the present invention is also applicable to such hand phones. An external wire 433 extends from the hold-free circuit set 4A (FIG. 7) of the interface circuit 4. A plug 434 of the external wire 433 is inserted into the socket 324 of the hand phone 3 to transmit the peripheral signals.

The interface board 4 of the present invention is constructed such that the front and back mating faces are designed and dimensioned for various types of hand phones and batteries so as to permit the hand phones 3 to be freely used without holding. The battery 5 is generally associated with the hand phone in two manners. One is the slide rail type and the other is the engaging seat type. FIGS. 3 and 4 show the slide rail type. The rails 511 of the mating face 51 of the battery are slidably inserted in the dovetail channels 313 of the back face 31 of the hand phone and then the movable engaging block 314 is engaged with the engaging seat 513 to complete the assembly of the battery 5 and the hand phone 3. The front mating face 41 of the interface board 4 is also disposed with rails 413 and engaging seat 414 and the back mating face 42 of the interface board 4 is disposed with dovetail channels 421 and movable engaging block 423 so that the interface board 4 can be sandwiched between the battery 5 and the hand phone 3.

FIGS. 5 and 6 show another embodiment of the present invention, wherein the battery 5 and the hand phone 3 are associated in an engaging manner. An engaging recess 321 is disposed at an upper end of the back face 32 of the hand phone and a locating recess 323 is disposed at a lower end thereof. A projecting block 523 is disposed at a lower end of the mating face 52 of the battery or inserting into the locating recess 323. A movable engaging block 521 is disposed at an upper end of the mating face 52 of the battery for engaging with the engaging recess 321 of the hand phone 3. Accordingly, the interface board 4 is also formed with movable engaging block 431 and projecting block 435 on the front mating face 43 and an engaging recess 443 and a locating recess 442 on the back mating face 44 so that the interface board 4 can be sandwiched between the battery and the hand phone. In addition, several power contacts 432 are disposed at lower end of the front mating face 43 of the interface board 4 to contact with the power contacts 322 of the hand phone 3 and several power contacts 441 are disposed at lower end of the back mating face 44 of the interface board 4 to contact with the power contacts 522 of the mating face 52 of the battery. By means of the contacts, the battery 5 is able to provide power for both the hold free device and the hand phone.

FIG. 9 shows the application of the present invention, wherein the interface board 4, the battery 5 and the hand phone 3 are associated together and hung the on belt or girdle of a user. An earphone 61 is connected to the hand phone by the external wire set 6 and plugged in the user's ear and a microphone 62 is fastened to the neck of the clothes of the user near the mouth thereof by a clip 63. Therefore, the user can communicate with others while moving without holding the hand phone.

In FIG. 7 the hold-free circuit set 4A includes a hold-free circuit 45 (see FIG. 8) and a power-saving circuit 46 (see FIG. 8). The hold-free circuit 45, as shown in FIG. 7, is composed of a speaker amplifying circuit 451, a microphone amplifying circuit 452, a hold-free triggering circuit 453 and a speech memory IC 454 which are all connected to the hand phone 3. The speaker amplifying circuit 451 and the microphone amplifying circuit 452 are used to amplify the voice signal. The hold-free triggering circuit 453 is used to trigger the above two amplifying circuits. The speech memory IC 454 is used as an answering means.

FIG. 8 shows the power saving circuit 46 which utilizes a difference between the high load of the hand phone when connected and a low load of the hand phone when disconnected to activate the hold-free circuit. A comparator 461 is used to compare the voltage of point A with the voltage of point B. Therefore, three resistors of the circuit and the battery form a bridge circuit 463. In case the voltage of two ends of the bridge circuit changes, this means the load of the battery is changing. A voltage is then output to activate a transistor gate current switch 462 to provide the power for the hold-free circuit 45.

In conclusion, the present invention can be used without holding the hand phone during driving a car, riding a motorcycle or a bicycle, walking or in other conditions in which it inconvenient for the user to hold the hand phone. The present invention also can save the-power so as to prolong the using time of the battery.

The above embodiments are only some examples of the present invention and the scope of the present invention should not be limited to the examples. Any modification or variation derived from the examples should fall within the scope of the present invention.

What is claimed is:

1. A portable hold-free device for a hand phone, comprising an interface board and an external wire set connected thereto, a hold-free circuit set being contained in the interface board, the external wire set including an earphone and a microphone, said interface board being substantially entirely sandwiched between a battery and a hand phone, and said interface board having a front mating face mating to a back mating face of the hand phone and a back mating face mating to a front mating face of the battery.

2. A hold-free device as claim in claim 1, wherein the interface board is disposed with an external wire with a plug which is inserted into a signal transmitting socket of the interface board so as to transmit a peripheral signal.

3. A hold-free device as claimed in claim 1, wherein the hold-free circuit set of the interface board comprises a speaker amplifying circuit, a microphone amplifying circuit and a bold-free triggering circuit.

4. A hold-free device as claimed in claim 1, wherein the hold-free circuit set of the interface board comprises a power-saving circuit which utilizes a difference between a high load of the hand phone when the hand phone is connected to the interface boadr and a low load of the hand phone when the hand phone is disconnected from the interface board to activate the hold-free circuit so as to save power.

5. A hold-free device as claimed in claim 1, wherein the hold-free circuit set of the interface board comprises a speech memory IC serving as an answering machine.

\* \* \* \* \*